Patented Dec. 22, 1925.

1,566,817

UNITED STATES PATENT OFFICE.

CARNIE B. CARTER AND ALBERT E. COXE, OF PITTSBURGH, PENNSYLVANIA, ASSIGNORS TO S. KARPEN & BROS., OF CHICAGO, ILLINOIS, A CORPORATION OF WEST VIRGINIA.

PRODUCTION OF PHENOL-METHYLAL RESIN.

No Drawing.   Application filed August 23, 1922.   Serial No. 583,917.

*To all whom it may concern:*

Be it known that we, CARNIE B. CARTER and ALBERT E. COXE, citizens of the United States, residing at Pittsburgh, in the county of Allegheny and State of Pennsylvania, have invented new and useful Improvements in the Production of Phenol-Methylal Resins, of which the following is a specification.

The present invention is in the nature of a process for producing phenolic condensation products from phenols and methylals.

The primary object is to provide a simple and practicable method of producing phenolic condensation products from the materials mentioned.

The methylals are derivatives of formaldehyde and alcohols. They are formed conveniently by the condensation of an alcohol with formaldehyde, in the presence of an acid condensing agent. The condensation may be represented by the reaction between formaldehyde and methyl alcohol to produce dimethyl methylal:

$$2CH_3OH + CH_2O = CH_3OCH_2OCH_3 + H_2O.$$

It is only necessary in order to effect the condensation to mix 1.5 parts of methyl alcohol, containing 1% to 2% hydrochloric acid, with 1 part of commercial formalin and 1 part of fused calcium chloride and allow the mixture to stand at ordinary temperatures for several hours. Methylal is then recovered from the resulting mixture by fractional distillation. Yields amounting to 75% to 80% of the theoretical value may be obtained in this way.

A large number of methylals may be prepared from formaldehyde and the various alcohols. If the methyl alcohol used in the preparation above is substituted by ethyl, propyl, butyl, etc., alcohols we obtain the following series of methylals:

| | Boiling point. |
|---|---|
| Dimethyl methylal $(CH_3O)_2CH_2$ | 42° C. |
| Diethyl methylal $(C_2H_5O)_2CH_2$ | 89° C. |
| Dipropyl methylal $(C_3H_7O)_2CH_2$ | 137° C. |
| Dibutyl methylal $(C_5H_9O)_2CH_2$ | 164° C. |

The methylals are liquids which are quite stable in the presence of alkalies, but which are more or less easily hydrolyzed in the presence of acids to formaldehyde and the corresponding alcohols.

The methylals condense with phenol or cresols in the presence of water and an acid condensing agent to form phenolic resins. The resins are fusible, hard brittle products soluble in aqueous alkalies, alcohol, ether, acetone, etc., if the phenol and methylal are condensed in the proper proportions to produce resins of this character. Acids which may be used are hydrochloric, formic, acetic, oxalic, etc.

The acid employed as a catalyst may be employed in minute quantities. If no acid be employed, the condensation will be so slow and incomplete as to be impracticable. It has been demonstrated that by employing 0.001 per cent acid as a catalyst, a reaction which is about 60 per cent complete can be effected at a temperature of 170° to 180° C by heating for a period of about 4½ hours. If however, the acid be taken in a proportion of 0.01 per cent, the reaction at the same temperature will be substantially complete in about 2½ hours; and by employing about 0.1 per cent of hydrochloric acid, the reaction is found to be complete in about one hour. The most practicable concentration of acid, therefore, appears to be from .05 to 0.1 per cent, although a still lower concentration may be employed by adopting a correspondingly longer period of heating.

The resin may be recovered from the test tubes used above as follows:

The tube is opened and heated to distill off the alcohol resulting from the reaction. This operation liberates the small amount of resin held in solution by the alcohol and leaves the resin forming a lower layer and water forming an upper layer. The water is decanted off and the excess phenol is then blown off with a steam or air at an elevated temperature. If air is excluded during this operation a resin will be obtained which is clear, hard, brittle and practically devoid of all color. The resin is soluble in aqueous alkalies, alcohol, ether, acetone, etc., and possesses all of the properties of fusible soluble resins prepared from phenol and formaldehyde or hexamethylene tetramine.

The temperature specified above is 170° to 180° C. This is a satisfactory working temperature, but it does not follow that the reaction does not take place satisfactorily at lower temperatures. It is entirely practical to perform the condensation at lower temperatures. In fact, the reaction takes place at 100° C. in 24 to 48 hours if the reaction mixture carries 0.05 to 0.1% of acid condensing agent.

Any suitable phenolic body may be employed in lieu of phenol. For example, the cresols may be condensed with equal facility; and dimethyl methylal may be supplanted by the various methylals derived from ethyl, propyl, butyl, etc., alcohols. The reaction is general for the methylals as a class of substances.

The methylals are quite stable in the presence of aqueous alkalies, so that alkalies or bases are not suitable to be used for condensing agents.

The reaction may be performed in practice by using an autoclave of suitable capacity instead of a test tube. One of the methylals, a phenol, or cresol, and water in proper proportions, together with a minute amount of acid condensing agent are heated in the autoclave for one or more hours, depending upon the temperature employed. The alcohol resulting from the reaction is then distilled off and recovered, leaving the resin and water behind. The alcohol may be used in preparing fresh methylal. Water is separated from the resin, after which the excess phenol, if such be present, or a part thereof, may be boiled off or blown off with steam or air at elevated temperature, the resin being left behind. Usually, it is desirable to employ a considerable excess of the phenolic body, say enough to give about 1½ phenolic groups to each methylene group. This produces a fusible soluble resin; and after some of the excess phenol, say 10 per cent or more, is blown off, the resin still remains fusible and soluble, but at room temperature is hard and brittle.

The fusible and soluble resin may be employed in producing a final infusible and substantially insoluble phenolic condensation product in accordance with known methods. For example, hexamethylenetetramine, formaldehyde, or other suitable active methylene body may be mixed with the fusible and soluble resin in sufficient proportion to give to the mass about one methylene group to each phenolic group. When such mass is subjected to the action of heat for a suitable length of time the mass is converted to the final infusible and substantially insoluble state.

Before conversion to the final state, suitable dyes or pigments and suitable filling materials may be mixed with the mass, if desired. In practice, methylal from a storage tank is delivered into an autoclave, where acidified water and phenol in requisite amounts are added. Heat is applied and continued for a sufficient time at a suitable temperature, say 100° C. to 180° C., to effect complete reaction, if desired. Where the phenolic body is used in large excess, there is no danger of converting the product to the final state in the autoclave, hence the heating operation may be carried on at high temperature for a sufficient period of time to insure complete reaction of the methylal with the phenolic body. The materials are drawn from the autoclave into a still, the alcohol is distilled off, and the water is discharged into one vessel and the resin is discharged into another vessel. The resin may then be treated in any desired manner to produce a final infusible and insoluble product. If desired, the resin may be dissolved in alcohol or other suitable solvent and employed as a varnish or lacquer.

The foregoing detailed description has been given for clearness of understanding only and no unnecessary limitations should be understood therefrom, but the appended claims should be construed as broadly as permissible in view of the prior art.

What we regard as new, and desire to secure by Letters Patent, is—

1. The method of producing a phenolic condensation product which comprises: subjecting to the action of heat and pressure a phenolic body and a methylal in the presence of acid and water.

2. The method of producing a phenolic condensation product which comprises: subjecting to the action of heat and pressure a phenolic body and a methylal in the presence of water and a small percentage of acid.

3. The process of producing a phenolic condensation product which comprises: subjecting to the action of heat and pressure a phenolic body and a methylal in the presence of water and a small percentage of acid, the phenolic body being taken in excess of an equimolecular proportion and the reaction being carried on until all of the methylal is combined with the phenolic body.

4. The process of producing a phenolic condensation product which comprises: subjecting a phenolic body and a methylal, water and a small percentage of acid to the action of heat and pressure; subjecting the resultant liquid to distillation to remove the alcohol formed, and separating the water from the resin formed.

5. The process of producing a phenolic condensation product which comprises: subjecting to the action of heat and pressure a phenolic body and a methylal in the presence of water and a small percentage of acid, the phenolic body being taken in large excess of the equimolecular proportion and the reaction being carried on until all of the methylal is combined with the phenolic body; subjecting the resultant liquid to distillation to remove the alcohol formed; and separating the water from the resin formed.

CARNIE B. CARTER.
ALBERT E. COXE.